United States Patent
Liu et al.

(10) Patent No.: US 12,024,209 B2
(45) Date of Patent: Jul. 2, 2024

(54) METHOD AND APPARATUS FOR VEHICLE CONTROL

(71) Applicant: Beijing Tusen Weilai Technology Co., Ltd., Beijing (CN)

(72) Inventors: Qiyuan Liu, Beijing (CN); Nan Wu, Beijing (CN); Weijun Liu, Beijing (CN)

(73) Assignee: BEIJING TUSEN WEILAI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/986,678

(22) Filed: Nov. 14, 2022

(65) Prior Publication Data

US 2023/0073942 A1   Mar. 9, 2023

Related U.S. Application Data

(63) Continuation of application No. 16/576,622, filed on Sep. 19, 2019, now Pat. No. 11,500,375, which is a
(Continued)

(30) Foreign Application Priority Data

Mar. 22, 2017   (CN) .......................... 201710172083.6

(51) Int. Cl.
*B60W 60/00*   (2020.01)
*B60W 30/18*   (2012.01)
(Continued)

(52) U.S. Cl.
CPC ...... *B60W 60/0055* (2020.02); *B60W 30/181* (2013.01); *B60W 50/08* (2013.01);
(Continued)

(58) Field of Classification Search
CPC .... G05D 1/0061; G05D 1/021; G05D 1/0214; G05D 1/0223; G05D 1/0246;
(Continued)

(56) References Cited

U.S. PATENT DOCUMENTS

2005/0052076 A1* 3/2005 Watanabe ........... B60T 8/17616
                                                       303/113.1
2005/0075777 A1   4/2005 Kim
(Continued)

FOREIGN PATENT DOCUMENTS

CN        103434502 A    12/2013
CN        105270407 A     1/2016
(Continued)

OTHER PUBLICATIONS

International Application No. PCT/CN2017/102030, International Search Report and Written Opinion Mailed Dec. 29, 2017.

*Primary Examiner* — Dale W Hilgendorf
*Assistant Examiner* — Frank T Glenn, III
(74) *Attorney, Agent, or Firm* — Perkins Coie LLP

(57) ABSTRACT

The present disclosure provides a method and an apparatus for vehicle control. The method includes: obtaining (101) manual operation information of a vehicle; determining (102) an intervention intention of a driver based on the manual operation information; and controlling (103), when the vehicle is currently in an automated driving mode and the intervention intention is determined to be a slow intervention, the vehicle to reach a predetermined safe state and handing corresponding control of the vehicle over to the driver. The method and apparatus can solve potential safety problems in vehicle control and improve safety of the vehicle control.

18 Claims, 8 Drawing Sheets

Related U.S. Application Data continuation of application No. PCT/CN2017/102030, filed on Sep. 18, 2017.

(51) Int. Cl.
  *B60W 50/00* (2006.01)
  *B60W 50/08* (2020.01)

(52) U.S. Cl.
  CPC ...... *B60W 50/082* (2013.01); *B60W 60/0059* (2020.02); *B60W 2050/0063* (2013.01); *B60W 2050/0072* (2013.01); *B60W 2420/403* (2013.01); *B60W 2420/408* (2024.01); *B60W 2540/21* (2020.02); *B60W 2540/215* (2020.02); *B60W 2540/22* (2013.01); *B60W 2540/223* (2020.02)

(58) Field of Classification Search
  CPC .... G05D 1/0257; G05D 1/0276; G05D 1/028; G05D 2201/0212; B60W 30/181; B60W 50/08; B60W 2050/0063; B60W 2050/0072; B60W 2540/215; B60W 60/0015; B60W 60/0053
  See application file for complete search history.

(56) References Cited

U.S. PATENT DOCUMENTS

| | | | |
|---|---|---|---|
| 2013/0060413 A1 | 3/2013 | Lee | |
| 2015/0210312 A1* | 7/2015 | Stein | B60W 30/14 |
| | | | 701/41 |
| 2015/0274179 A1* | 10/2015 | Inoue | B60T 7/12 |
| | | | 701/70 |
| 2016/0202700 A1 | 7/2016 | Sprigg | |
| 2016/0207536 A1 | 7/2016 | Yamaoka | |
| 2016/0207538 A1* | 7/2016 | Urano | G05D 1/0061 |
| 2016/0244056 A1* | 8/2016 | Seguchi | B60W 30/12 |
| 2016/0298762 A1 | 10/2016 | Bang | |
| 2016/0362116 A1* | 12/2016 | Otsuka | B60W 60/0051 |
| 2017/0017233 A1* | 1/2017 | Ichikawa | B60W 50/082 |
| 2017/0106839 A1 | 4/2017 | Uechi | |

FOREIGN PATENT DOCUMENTS

| | | |
|---|---|---|
| CN | 105807764 A | 7/2016 |
| CN | 105988467 A | 10/2016 |
| CN | 106023458 A | 10/2016 |
| CN | 106043309 A | 10/2016 |
| CN | 106467106 A | 3/2017 |
| CN | 106873596 A | 6/2017 |
| WO | 2014141351 | 2/2017 |

* cited by examiner

METHOD AND APPARATUS FOR VEHICLE CONTROL

CROSS-REFERENCE TO RELATED APPLICATION

This application claims priority to U.S. patent application Ser. No. 16/576,622 filed Sep. 19, 2019, which claims priority to Chinese Patent Application No. 201710172083.6, titled "METHOD AND APPARATUS FOR VEHICLE CONTROL", filed on Mar. 22, 2017, the content of which is incorporated herein by reference in its entirety.

TECHNICAL FIELD

The present disclosure relates to vehicle engineering technology, and more particularly, to a method and an apparatus for vehicle control.

BACKGROUND

Currently, in the field of automated driving, a manual driving mode and an automated driving mode are provided in order to control a vehicle. When the manual driving mode is activated, the full control of the vehicle is handed over to a driver immediately, such that the driver is in full control. When the automated driving mode is activated, the driver hands over the full control of the vehicle to the vehicle immediately, such that a main control unit of the vehicle can make decisions and control the vehicle for automated driving based on signals from sensors.

Currently, a physical switch is typically provided in the vehicle and the driver can select to activate the manual driving mode or the automated driving mode by triggering the physical switch, so as to achieve manual or automated control of the vehicle.

However, the existing scheme for vehicle control has the following problems.

(1) In the automated driving mode, when an emergency or a failure occurs and a human intervention is thus required, e.g., to make an emergency brake or a sharp turn, the driver in such an emergency may not be able to trigger the physical switch to switch from the current automated driving mode to the manual driving mode. In this case, the vehicle may not respond to manual operations, resulting in loss of control of the vehicle and an accident.

(2) If the vehicle is switched from the automated driving mode directly to the fully manual driving mode, since physiologically a human would need some time to take over and respond, the driver may not be able to fully enter a manual driving state from an automated driving state. During this transition period, the driver may operate improperly, e.g., the driver may erroneously step on a pedal or operate insufficiently or excessively, which may also result in loss of control of the vehicle and an accident.

To summarize, the existing scheme for vehicle control has some major safety issues.

SUMMARY

In view of the above problem, the present disclosure provides a method and an apparatus for vehicle control, capable of improving safety of vehicle control and reducing vehicle accidents.

In an aspect, according to an embodiment of the present disclosure, a method for vehicle control is provided. The method includes: obtaining manual operation information of a vehicle; determining an intervention intention of a driver based on the manual operation information; and controlling, when the vehicle is currently in an automated driving mode and the intervention intention is determined to be a slow intervention, the vehicle to reach a predetermined safe state and handing corresponding control of the vehicle over to the driver.

Correspondingly, according to an embodiment of the present disclosure, an apparatus for vehicle control is provided. The apparatus includes: an obtaining unit configured to obtain manual operation information of a vehicle; a determining unit configured to determine an intervention intention of a driver based on the manual operation information; and a first control unit configured to control, when the vehicle is currently in an automated driving mode and the intervention intention is determined to be a slow intervention, the vehicle to reach a predetermined safe state and hand corresponding control of the vehicle over to the driver.

In another aspect, according to an embodiment of the present disclosure, an apparatus for vehicle control is provided. The apparatus includes a processor and at least one memory storing at least one machine executable instruction. The processor is operative to execute the at least one machine executable instruction to: obtain manual operation information of a vehicle; determine an intervention intention of a driver based on the manual operation information; and control, when the vehicle is currently in an automated driving mode and the intervention intention is determined to be a slow intervention, the vehicle to reach a predetermined safe state and hand corresponding control of the vehicle over to the driver.

With the solutions according to the present disclosure, in an automated driving mode and before switched to a manual driving mode, a vehicle can be control to reach a safe state in response to determining that a driver is to intervene slowly based on manual operation information, and corresponding control of the vehicle can be handed over to the driver while the vehicle is in the safe state. On one hand, the control of the vehicle can be transferred while ensuring safety of the vehicle. On the other hand, the corresponding control of the vehicle to be handed over to the driver can be partial or full control of the vehicle, which is more flexible and allows responding and adapting time for the driver. In this way, the chance that the driver would operate erroneously can be further reduced and the safety in driving the vehicle can be further improved.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The core idea of the present disclosure has been described above. The solutions according to the embodiments of the present disclosure will be described in further detail below with reference to the figures, such that they can be better understood by those skilled in the art and that the above objects, features and advantages of the embodiments of the present disclosure will become more apparent.

Embodiment 1

Figure 1:
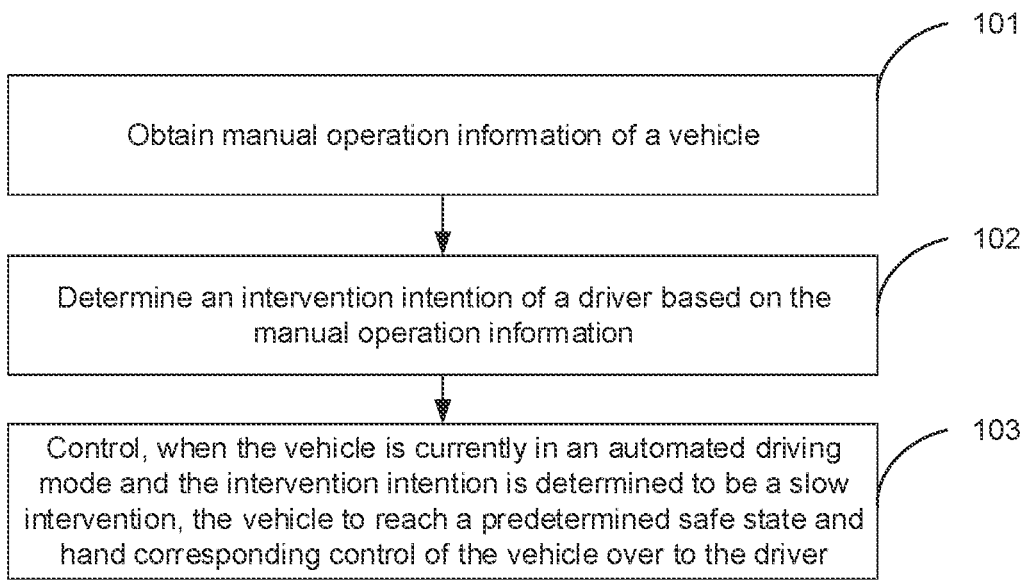
FIG. 1 is a first flowchart illustrating a method for vehicle control according to an embodiment of the present disclosure.

FIG. 1 is a flowchart illustrating a method for vehicle control according to Embodiment 1 of the present disclosure. Referring to FIG. 1, the method includes the following steps.

At step 101, manual operation information of a vehicle is obtained.

At step 102, an intervention intention of a driver is determined based on the manual operation information.

At step 103, when the vehicle is currently in an automated driving mode and the intervention intention is determined to be a slow intervention, the vehicle is controlled to reach a predetermined safe state and corresponding control of the vehicle is handed over to the driver.

Figure 2:
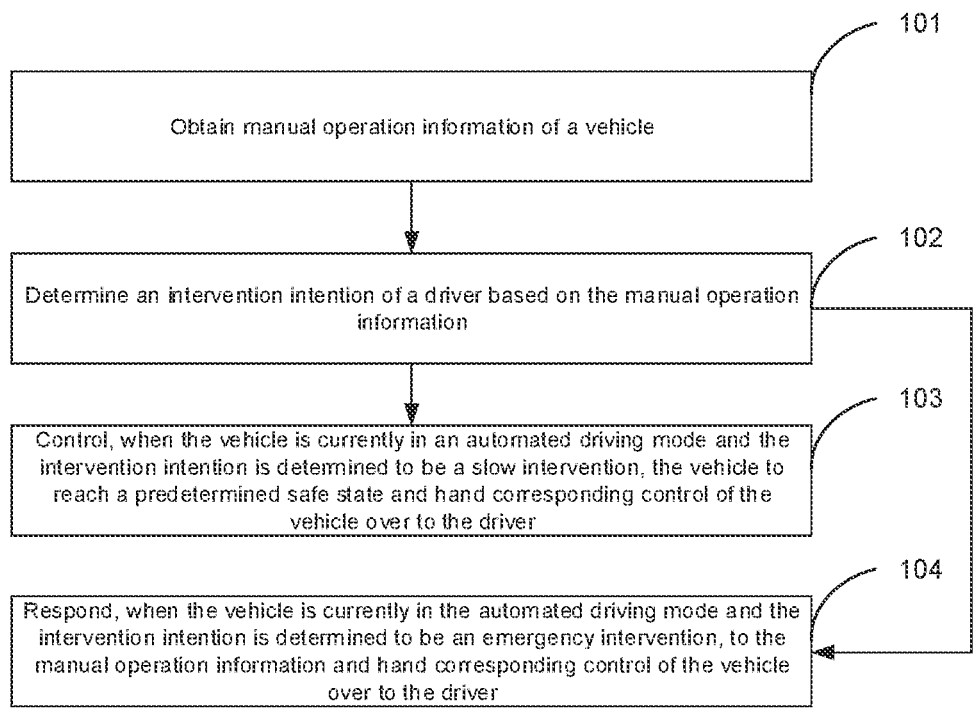
FIG. 2 is a second flowchart illustrating a method for vehicle control according to an embodiment of the present disclosure.

Preferably, in order to avoid the problem that, when an emergency or an urgent situation occurs in an automated driving mode, a human intervention is required but the vehicle does not respond, resulting in a vehicle accident, according to an embodiment of the present disclosure, the method process shown in FIG. 1 may further include the following step 104, as shown in FIG. 2.

At step 104, when the vehicle is currently in the automated driving mode and the intervention intention is determined to be an emergency intervention, the manual operation information can be responded to and corresponding control of the vehicle can be handed over to the driver.

Preferably, in an embodiment of the present disclosure, in the above step 103 as shown in FIGS. 1 and 2, the controlling of the vehicle to reach the predetermined safe state may include, but not limited to: controlling the vehicle to decelerate and maintain its lane, until the vehicle stops in a safe area. Here the safe area may be an emergency lane, a service area or a parking area. It can be appreciated by those skilled in the art that the controlling may include: controlling the vehicle to change its lane and stop in a safe area such as an emergency lane, a service area or a parking area, or alternatively to follow a vehicle. The present disclosure is not limited to any of these schemes and they can be used flexibly by those skilled in the art depending on actual requirements.

Preferably, in an embodiment of the present disclosure, there may be various types of schemes for obtaining the manual operation information of the vehicle. The present disclosure is not limited to any of these schemes. For example, the manual operation information can be obtained using any one or more or combination of the following schemes.

Scheme 1: A control instruction issued by the driver to operate a lateral controller (e.g., a steering wheel or any other steering mechanism) and/or a longitudinal controller (e.g., a brake controller or a throttle controller) of the vehicle can be collected, and the manual operation information can be obtained from the control instruction. For example, an opening degree of a brake pedal can be collected when the driver steps on the pedal and converted into a value for a braking degree by which the vehicle is controlled to brake, and then a deceleration request signal can be transmitted to a vehicle-mounted Controller Area Network (CAN) bus.

Scheme 2: A voice instruction from and driver can be collected, and the manual operation information can be obtained by identifying the voice instruction. For example, the voice instruction from and driver can be collected using a voice collection device in a Human Machine Interface (HMI) system, and voice identified to obtain semantics corresponding to the voice instruction. The semantics can be compared with a set of predefined instructions to obtain a predefined control instruction to be executed, i.e., the manual operation information. For example, when the voice instruction from the driver is "emergency brake now", the corresponding semantics obtained can be "emergency brake" and the corresponding manual operation information can be "brake 100%".

Scheme 3: Touch information indicating a particular gesture made by the driver in a particular area on a touch display device can be collected, and the manual operation information can be obtained by identifying the touch information. For example, with a touch display device in an HMI system, a predefined control instruction to be executed (i.e., the manual operation information) can be obtained by identifying a gesture made by the driver in a touch area on the touch display device. For example, a particular area (for example) on the touch display device can be preconfigured as a turning area, and three fingers sliding leftwards simultaneously may mean turning left, three fingers sliding rightwards simultaneously may mean turning right, three fingers sliding upwards simultaneously may mean going straight ahead, three fingers sliding downwards simultaneously may mean reversing, and one finger drawing a circle may mean stopping, etc. This can be configured flexibly by those skilled in the art depending on actual requirements and user customs, and the present disclosure is not limited to this.

Scheme 4: A control instruction inputted by the driver via a preconfigured physical switch can be received, and the manual operation information can be obtained by parsing the control instruction. For example, a physical switch (e.g., a rocker switch, an auto resettable switch or an auto-lock switch) can be provided at a position in the vehicle that is convenient for a user to operate, e.g., on a steering wheel. The driver can input the control instruction via the physical switch. This can be configured flexibly by those skilled in the art depending on actual requirements and user customs, and the present disclosure is not limited to this.

Scheme 5: The manual operation information can be obtained by identifying an operation on a rocker or a handle. For example, a communication protocol can be predefined for each operation of the rocker and a higher layer vehicle controller can receive and parse a signal from a rocker controller to obtain the control instruction to be executed (i.e., the manual operation information). For example, pushing the rocker forward may mean acceleration, pushing the rocker rightwards may mean turning left, and a function key 1 may mean brake, etc. This can be configured flexibly by those skilled in the art depending on actual requirements and user customs, and the present disclosure is not limited to this.

Scheme 6: A control instruction issued by the driver by executing a preconfigured application on a smart terminal can be received, and the manual operation information can be obtained by parsing the control instruction. For example, with a smart terminal connected to an internal network of the vehicle, the driver can execute a preconfigured application on the smart terminal and an instruction issued by the driver by executing the preconfigured application can be uploaded to a higher layer vehicle controller, such that the higher layer vehicle controller can parse the instruction to obtain the control instruction to be executed (i.e., the manual operation information).

Scheme 7: Brainwave information of the driver can be collected using a brainwave collector, and the manual operation information can be obtained by identifying the brainwave information. For example, the brainwave collector may be connected to a higher layer vehicle controller, such that the brainwave of the driver can be identified to obtain the predefined control instruction to be executed (i.e., the manual operation information).

Scheme 8: A body movement and/or a facial expression of the driver can be captured using a monitoring sensor, and the manual operation information can be obtained from the body movement and/or the facial expression. For example, a camera or a radar can be provided in the driver's cab and to monitor the driver's health state or mental state and to identify driver's body movement and/or facial expression, so as to obtain the predefined control instruction to be executed. For example, the driver raising his/her hand and moving the hand leftwards may mean turning left, the driver raising his/her hand and moving the hand rightwards may mean turning right (referring to e.g., gestures of traffic police). This can be configured flexibly by those skilled in the art depending on actual requirements and user customs, and the present disclosure is not limited to this.

When one of the above schemes is used in the above step 101, the scheme can be used to obtain the corresponding manual operation information. When two or more of the above schemes are used in the above step 101, the final manual operation information can be, but not limited to be, obtained by: 1) obtaining initial manual operation information using each of the schemes, evaluating a confidence level of each piece of initial manual operation information and selecting the initial manual operation information having the highest confidence level as the final manual operation information; or 2) obtaining initial manual operation information using each of the schemes, and determining the initial manual operation information having the most pieces of the same initial manual operation information as the final manual operation information, by applying a majority rule.

Preferably, in an embodiment of the present disclosure, lateral control, longitudinal control and other control (e.g., activation/deactivation of the automated driving mode, stop/start, control of turn signal lights, control of windshield wipers, etc.) of the vehicle can be achieved. In order to describe the solutions of the present disclosure in further detail such that they can be better understood by those skilled in the art, detailed description will be given below with reference to some examples.

With the solutions according to the present disclosure, in an automated driving mode and before switched to a manual driving mode, a vehicle can be control to reach a safe state in response to determining that a driver is to intervene slowly based on manual operation information, and corresponding control of the vehicle can be handed over to the driver while the vehicle is in the safe state. On one hand, the control of the vehicle can be transferred while ensuring safety of the vehicle. On the other hand, the corresponding control of the vehicle to be handed over to the driver can be partial or full control of the vehicle, which is more flexible and allows responding and adapting time for the driver. In this way, the chance that the driver would operate erroneously can be further reduced and the safety in driving the vehicle can be further improved.

Embodiment 2—Longitudinal Control of Vehicle

In Embodiment 2 of the present disclosure, an acceleration control, a deceleration control, or an acceleration and deceleration control of a vehicle can be achieved.

Figure 3:
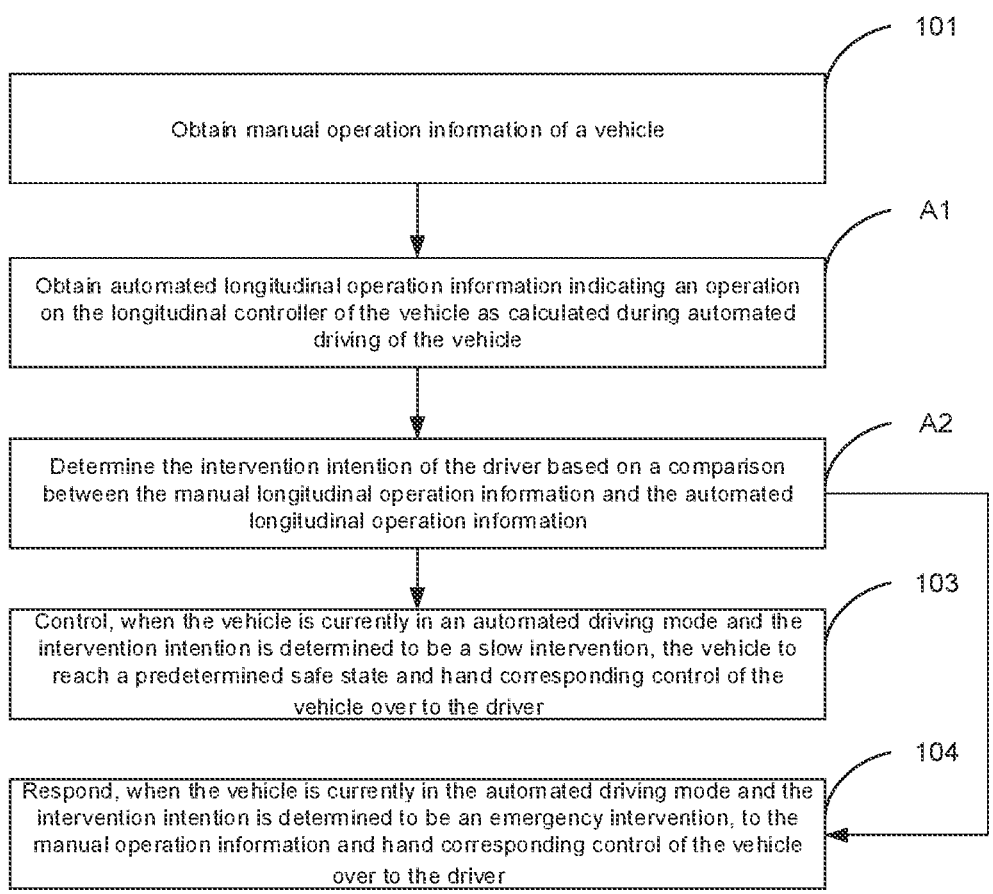
FIG. 3 is a third flowchart illustrating a method for vehicle control according to an embodiment of the present disclosure.

In the above methods shown in FIGS. 1 and 2, the above manual operation information can include manual longitudinal operation information indicating an operation on a longitudinal controller of the vehicle. The above step 102 of determining the intervention intention of the driver based on the manual operation information can be implemented using the following steps A1~A2, as shown in FIG. 3.

At step A1, automated longitudinal operation information indicating an operation on the longitudinal controller of the vehicle as calculated during automated driving of the vehicle can be obtained.

In an embodiment of the present disclosure, an unmanned driving control unit provided on the vehicle can make decisions and control controllers on the vehicle, e.g., to control the vehicle to decelerate, accelerate, change its lane or stop, based on state information of the vehicle and environment information collected by sensors provided on the vehicle. The unmanned driving control unit can be implemented using a higher layer vehicle controller, e.g., a Field Programmable Gate Array (FPGA), a Digital Signal Processor (DSP), an Electronic Control Unit (ECU), a Vehicle Control Unit (VCU), an industrial computer or any other device capable of information processing. In the above step A1, a request can be transmitted to the unmanned driving control unit for obtaining the automated longitudinal operation information indicating the operation on the longitudinal controller of the vehicle. Alternatively, information transmitted periodically from the unmanned driving control unit can be received passively and the automated longitudinal operation information indicating the operation on the longitudinal controller of the vehicle can be obtained from the information. The present disclosure is not limited to any specific approach for obtaining the automated longitudinal operation information indicating the operation on the longitudinal controller of the vehicle.

At step A2, the intervention intention of the driver is determined based on a comparison between the manual longitudinal operation information and the automated longitudinal operation information.

Figure 4:
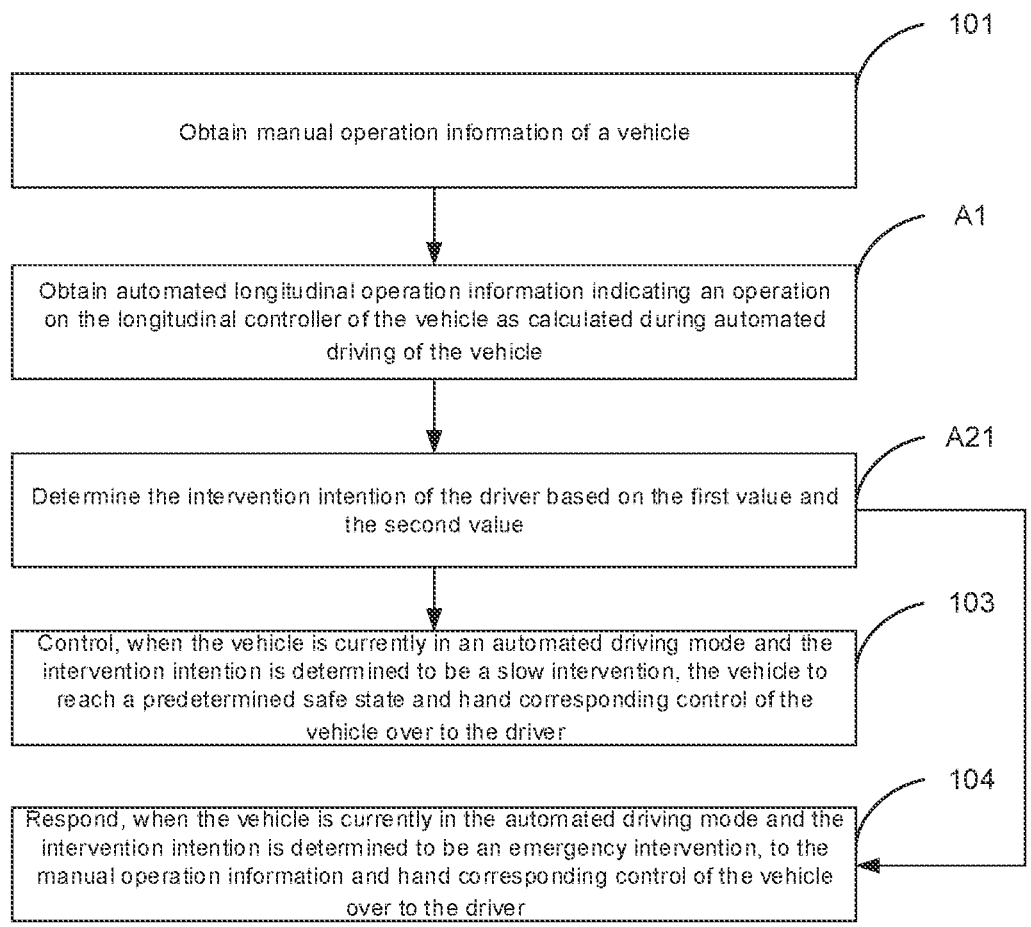
FIG. 4 is a fourth flowchart illustrating a method for vehicle control according to an embodiment of the present disclosure.

Preferably, in an embodiment of the present disclosure, the manual longitudinal operation information can include a first value representing an extent of operation on the longitudinal controller by the driver and the automated longitudinal operation information can include a second value representing a calculated extent of operation on the longitudinal controller (calculated by the above unmanned driving control unit). In this case, the step A2 shown in FIG. 3 can be implemented using a step A21, as shown in FIG. 4.

At step A21, the intervention intention of the driver is determined based on the first value and the second value.

In particular, the above step A21 can be implemented using any of the following Solutions 1~3.

Solution 1: The intervention intention of the driver can be determined to be the slow intervention when determining that the first value is larger than the second value and a difference between the first value and the second value is between a first threshold and a second threshold, the first threshold being smaller than the second threshold.

Solution 2: The intervention intention of the driver can be determined to be the emergency intervention when determining that the first value is larger than the second value and the difference between the first value and the second value is larger than the second threshold.

Solution 3: The intervention intention of the driver can be determined to be the slow intervention when determining that the first value is larger than the second value and the difference between the first value and the second value is between the first threshold and the second threshold, the first threshold being smaller than the second threshold, or to be the emergency intervention when determining that the first value is larger than the second value and the difference between the first value and the second value is larger than the second threshold.

Preferably, in order to avoid errors in the vehicle control due to response to the manual operation information when the driver operates erroneously, the above Solutions 1~3 can further include: when determining that the first value is smaller than or equal to the second value, or that the first value is larger than the second value and the difference between the first value and the second value is smaller than the first threshold, determining that the intervention intention of the driver is an erroneous operation. In this case, the manual operation information of the driver is not responded to.

In the embodiment of the present disclosure, the first threshold and the second threshold can be set depending on actual requirements and the present disclosure is not limited thereto.

Figure 5:
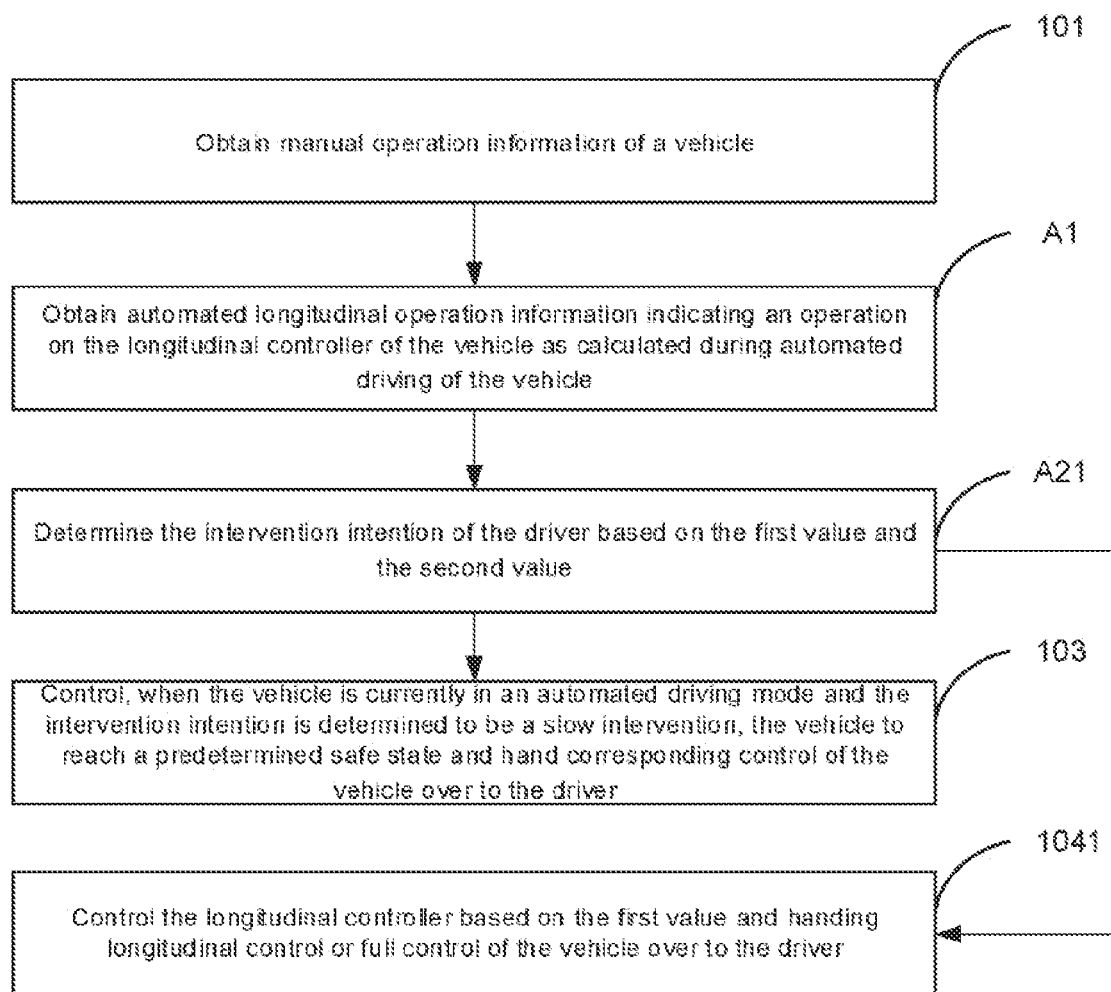
FIG. 5 is a fifth flowchart illustrating a method for vehicle control according to an embodiment of the present disclosure.

Preferably, when the intervention intention of the driver is determined to be the emergency intervention based on the first value and the second value, the step 104 of responding to the manual operation information and handing corresponding control of the vehicle over to the driver in the method shown in FIG. 4 may include, as shown in FIG. 5: at step 1041, controlling the longitudinal controller based on the first value and handing longitudinal control or full control of the vehicle over to the driver.

In the following, three examples will be given to describe the deceleration control, the acceleration control and the acceleration and deceleration control, respectively.

Example 1—Deceleration Control

In Example 1, the longitudinal controller is a brake controller. The above first value is a value representing an extent of braking in operating the brake controller by the driver, and the above second value is a value representing an extent of braking in operating the brake controller as calculated by the unmanned driving control unit. The extent of braking may refer to an opening degree of a brake pedal, a deceleration value or a torque value of an engine, and the present disclosure is not limited to any of these.

Example 2—Acceleration Control

In Example 2, the longitudinal controller is a throttle controller. The above first value a value representing an extent of acceleration in operating the throttle controller by the driver, and the above second value a value representing an extent of acceleration in operating the throttle controller as calculated by the unmanned driving control unit. The extent of braking may refer to an opening degree of a throttle pedal, an acceleration value, a torque value of an engine or a throttle percentage, and the present disclosure is not limited to any of these.

Example 3—Acceleration and Deceleration Control

Preferably, in order to avoid incorrect vehicle control caused by controlling the brake controller and the throttle controller simultaneously due to erroneous operations by the user, in an embodiment of the present disclosure, priorities can be set in advance, such that the priority of the deceleration control is higher than that of the acceleration control. When the manual longitudinal operation information includes first information indicating a deceleration control of the vehicle (i.e., operation information indicating the operation on the brake controller), the intervention intention of the driver is determined based on the first information. When the manual longitudinal operation information includes second information indicating an acceleration control of the vehicle (i.e., operation information indicating the operation on the throttle controller), it is also required to determine whether the manual longitudinal operation information also includes the above first information, and if so, the intervention intention of the driver is determined based on the first information, or otherwise the intervention intention of the driver is determined based on the second information.

Figure 6:
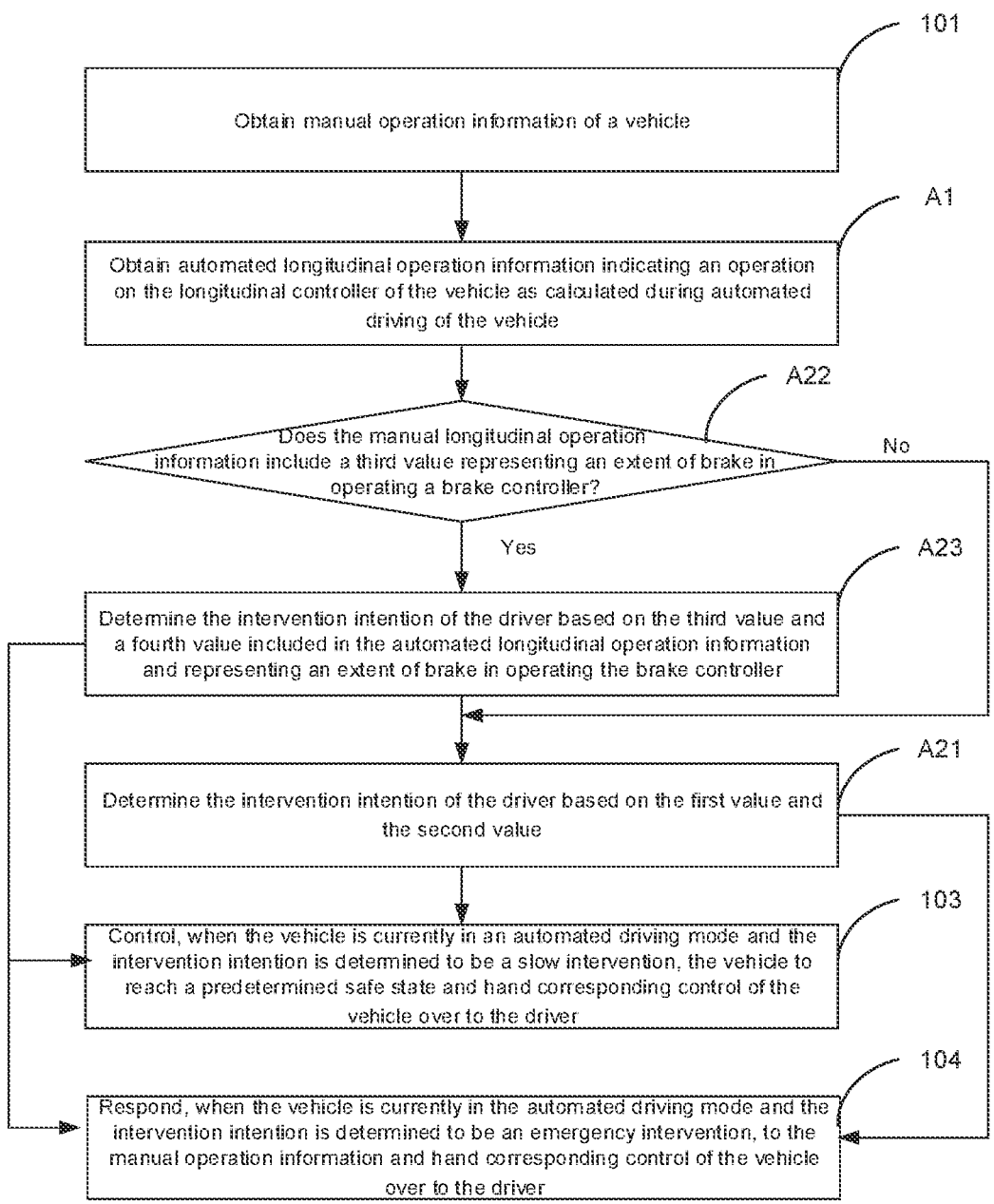
FIG. 6 is a sixth flowchart illustrating a method for vehicle control according to an embodiment of the present disclosure.

Thus, in the above method process shown in FIG. 4 or FIG. 5, the step A2 may further include steps A22~A23. For example, the method shown in FIG. 4 may further include steps A22~A23, as shown in FIG. 6.

At step A22, before the step A21, it is identified whether the manual longitudinal operation information includes a third value representing an extent of braking in operating a brake controller. If so, the process proceeds with step A23, or otherwise the process proceeds with step A21.

At step A23, the intervention intention of the driver is determined based on the third value and a fourth value included in the automated longitudinal operation information and representing an extent of braking in operating the brake controller.

In particular, in the step A23, the intervention intention of the driver can be determined to be the slow intervention when the third value is larger than the fourth value and a difference between the third value and the fourth value is between a third threshold and a fourth threshold, the third threshold being smaller than the fourth threshold. The intervention intention of the driver can be determined to be the emergency intervention when the third value is larger than the fourth value and the difference between the third value and the fourth value is larger than the fourth threshold. When the third value is smaller than the fourth value, the step A21 will be performed.

Embodiment 3—Lateral Control of Vehicle

Figure 7:
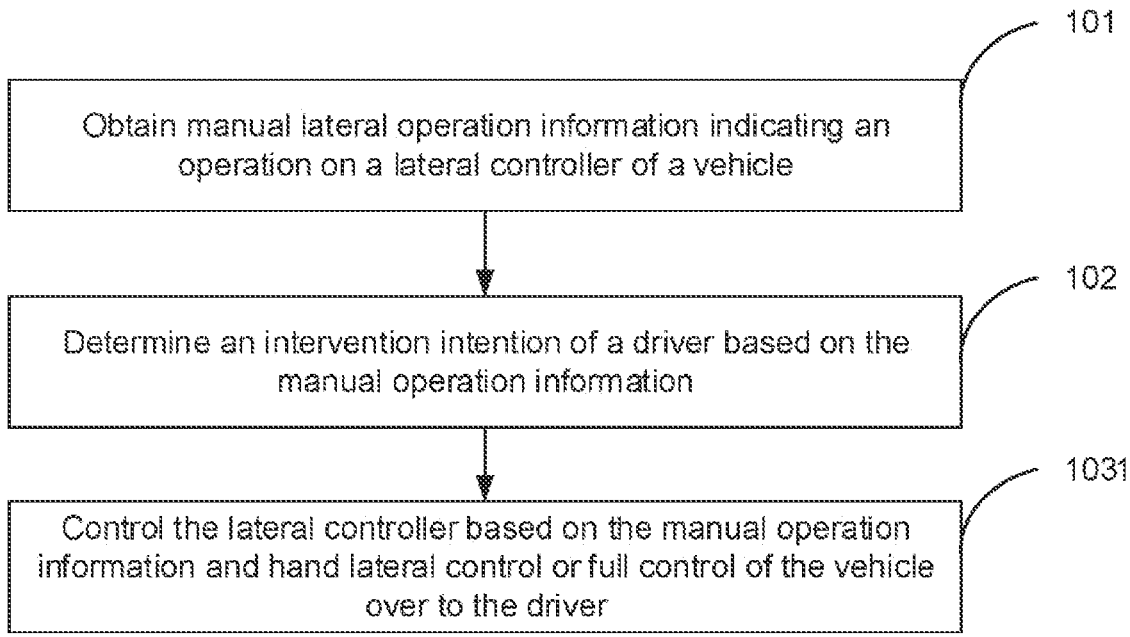
FIG. 7 is a seventh flowchart illustrating a method for vehicle control according to an embodiment of the present disclosure.

In Embodiment 3, the above manual operation information in the above methods shown in FIG. 1 and FIG. 2 can include manual lateral operation information indicating an operation on a lateral controller (e.g., a steering wheel) of the vehicle. As shown in FIG. 7, the above step 102 of determining the intervention intention of the driver based on the manual operation information may include: determining whether a fifth value included in the manual longitudinal operation information and representing an extent of operation on the lateral controller is larger than a predetermined fifth threshold, and if so, determining the intervention intention of the driver to be the emergency intervention. The step of responding to the manual operation information and handing the corresponding control of the vehicle over to the driver may include: controlling the lateral controller based on the fifth value and handing lateral control or full control of the vehicle over to the driver, i.e. step 1031 of FIG. 7.

In Embodiment 3 of the present disclosure, the manual lateral operation information may include an actual torque value actually applied by the steering wheel to a hydraulic steering mechanism or a hydraulic-electric hybrid steering mechanism or any other steering actuator of the vehicle.

Based on the same concept as the above method for vehicle control, an apparatus for vehicle control is provided according to an embodiment of the present disclosure. The structure of the apparatus will be described in detail with reference to the following embodiments.

Embodiment 4

Figure 8:
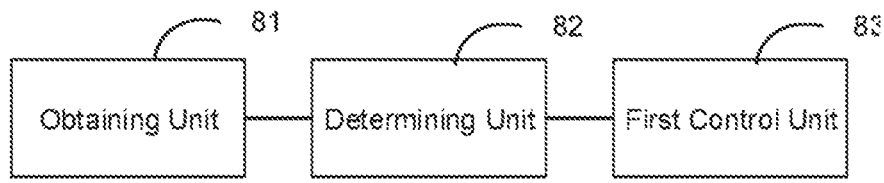
FIG. 8 is a first schematic diagram showing a structure of an apparatus for vehicle control according to an embodiment of the present disclosure.

FIG. 8 is a schematic diagram showing a structure of an apparatus for vehicle control according to an embodiment of the present disclosure. As shown in FIG. 8, the apparatus includes: an obtaining unit 81 configured to obtain manual operation information of a vehicle; a determining unit 82 configured to determine an intervention intention of a driver based on the manual operation information; and a first control unit 83 configured to control, when the vehicle is currently in an automated driving mode and the intervention intention is determined to be a slow intervention, the vehicle to reach a predetermined safe state and hand corresponding control of the vehicle over to the driver.

Figure 9:
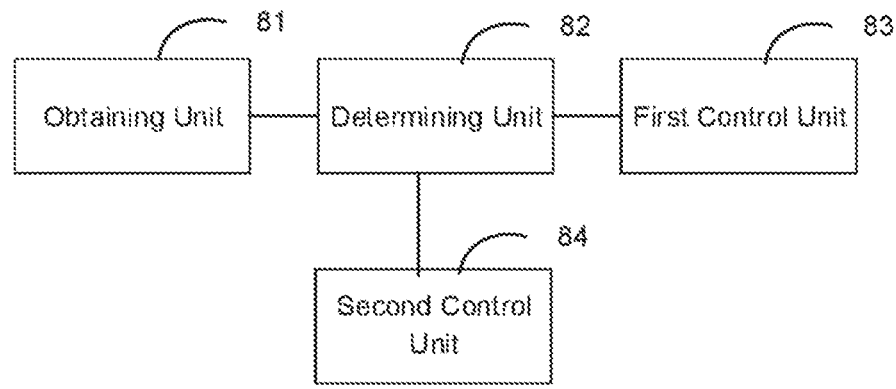
FIG. 9 is a second schematic diagram showing a structure of an apparatus for vehicle control according to an embodiment of the present disclosure.

Preferably, in order to avoid the problem that, when an emergency or an urgent situation occurs in an automated driving mode, a human intervention is required but the vehicle does not respond, resulting in a vehicle accident, the apparatus may further include a second control unit 84 configured to respond, when the vehicle is currently in the automated driving mode and the intervention intention is determined to be an emergency intervention, to the manual operation information and hand corresponding control of the vehicle over to the driver, as shown in FIG. 9.

Preferably, the first control unit 83 controlling the vehicle to reach the predetermined safe state can include: controlling the vehicle to decelerate and maintain its lane, until the vehicle stops in a safe area. Here the safe area may be an emergency lane, a service area or a parking area.

In an embodiment of the present disclosure, the first control unit 83 can be configured to control the vehicle to change its lane and stop in a safe area such as an emergency lane, a service area or a parking area, or alternatively to follow a vehicle. This can be set flexibly by those skilled in the art depending on actual requirements.

Preferably, as described above, there may be various types of schemes for the obtaining unit 81 to obtain the manual operation information of the vehicle. The present disclosure is not limited to any of these schemes. For example, the manual operation information can be obtained using any one or more or combination of the following schemes.

Scheme 1: A control instruction issued by the driver to operate a lateral controller (e.g., a steering wheel or any other steering mechanism) and/or a longitudinal controller (e.g., a brake controller or a throttle controller) of the vehicle can be collected, and the manual operation information can be obtained from the control instruction. For example, an opening degree of a brake pedal can be collected when the driver steps on the pedal and converted into a value for a braking degree by which the vehicle is controlled to brake, and then a deceleration request signal can be transmitted to a vehicle-mounted CAN bus.

Scheme 2: A voice instruction from and driver can be collected, and the manual operation information can be obtained by identifying the voice instruction. For example, the voice instruction from and driver can be collected using a voice collection device in an HMI system, and voice identified to obtain semantics corresponding to the voice instruction. The semantics can be compared with a set of predefined instructions to obtain a predefined control instruction to be executed, i.e., the manual operation information. For example, when the voice instruction from the driver is "emergency brake now", the corresponding semantics obtained can be "emergency brake" and the corresponding manual operation information can be "brake 100%".

Scheme 3: Touch information indicating a particular gesture made by the driver in a particular area on a touch display device can be collected, and the manual operation information can be obtained by identifying the touch information. For example, with a touch display device in an HMI system, a predefined control instruction to be executed (i.e., the manual operation information) can be obtained by identifying a gesture made by the driver in a touch area on the touch display device. For example, a particular area (for example)

on the touch display device can be preconfigured as a turning area, and three fingers sliding leftwards simultaneously may mean turning left, three fingers sliding rightwards simultaneously may mean turning right, three fingers sliding upwards simultaneously may mean going straight ahead, three fingers sliding downwards simultaneously may mean reversing, and one finger drawing a circle may mean stopping, etc. This can be configured flexibly by those skilled in the art depending on actual requirements and user customs, and the present disclosure is not limited to this.

Scheme 4: A control instruction inputted by the driver via a preconfigured physical switch can be received, and the manual operation information can be obtained by parsing the control instruction. For example, a physical switch (e.g., a rocker switch, an auto resettable switch or an auto-lock switch) can be provided at a position in the vehicle that is convenient for a user to operate, e.g., on a steering wheel. The driver can input the control instruction via the physical switch. This can be configured flexibly by those skilled in the art depending on actual requirements and user customs, and the present disclosure is not limited to this.

Scheme 5: The manual operation information can be obtained by identifying an operation on a rocker or a handle. For example, a communication protocol can be predefined for each operation of the rocker and a higher layer vehicle controller can receive and parse a signal from a rocker controller to obtain the control instruction to be executed (i.e., the manual operation information). For example, pushing the rocker forward may mean acceleration, pushing the rocker rightwards may mean turning left, and a function key 1 may mean brake, etc. This can be configured flexibly by those skilled in the art depending on actual requirements and user customs, and the present disclosure is not limited to this.

Scheme 6: A control instruction issued by the driver by executing a preconfigured application on a smart terminal can be received, and the manual operation information can be obtained by parsing the control instruction. For example, with a smart terminal connected to an internal network of the vehicle, the driver can execute a preconfigured application on the smart terminal and an instruction issued by the driver by executing the preconfigured application can be uploaded to a higher layer vehicle controller, such that the higher layer vehicle controller can parse the instruction to obtain the control instruction to be executed (i.e., the manual operation information).

Scheme 7: Brainwave information of the driver can be collected using a brainwave collector, and the manual operation information can be obtained by identifying the brainwave information. For example, the brainwave collector may be connected to a higher layer vehicle controller, such that the brainwave of the driver can be identified to obtain the predefined control instruction to be executed (i.e., the manual operation information).

Scheme 8: A body movement and/or a facial expression of the driver can be captured using a monitoring sensor, and the manual operation information can be obtained from the body movement and/or the facial expression. For example, a camera or a radar can be provided in the driver's cab and to monitor the driver's health state or mental state and to identify driver's body movement and/or facial expression, so as to obtain the predefined control instruction to be executed. For example, the driver raising his/her hand and moving the hand leftwards may mean turning left, the driver raising his/her hand and moving the hand rightwards may mean turning right (referring to e.g., gestures of traffic police). This can be configured flexibly by those skilled in the art depending on actual requirements and user customs, and the present disclosure is not limited to this.

When one of the above schemes is used by the obtaining unit 81, the scheme can be used to obtain the corresponding manual operation information. When two or more of the above schemes are used by the obtaining unit 81, the final manual operation information can be, but not limited to be, obtained by: 1) obtaining initial manual operation information using each of the schemes, evaluating a confidence level of each piece of initial manual operation information and selecting the initial manual operation information having the highest confidence level as the final manual operation information; or 2) obtaining initial manual operation information using each of the schemes, and determining the initial manual operation information having the most pieces of the same initial manual operation information as the final manual operation information, by applying a majority rule.

Preferably, in an embodiment of the present disclosure, lateral control, longitudinal control and other control (e.g., activation/deactivation of the automated driving mode, stop/start, control of turn signal lights, control of windshield wipers, etc.) of the vehicle can be achieved. In order to describe the solutions of the present disclosure in further detail such that they can be better understood by those skilled in the art, detailed description will be given below with reference to some examples.

Embodiment 5—Longitudinal Control of Vehicle

With the apparatus for vehicle control according to Embodiment 5 of the present disclosure, an acceleration control, a deceleration control, or an acceleration and deceleration control of a vehicle can be achieved.

Figure 10:
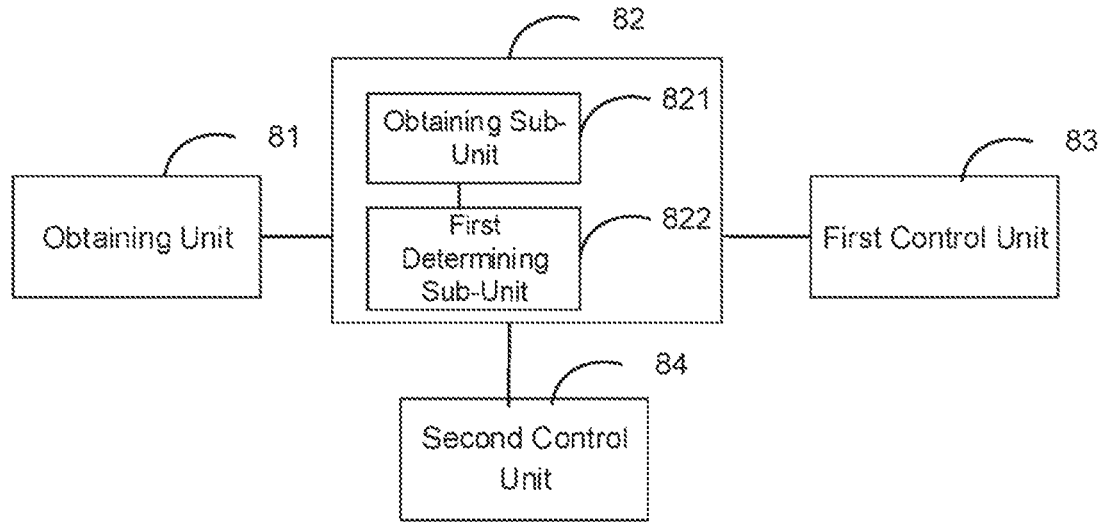
FIG. 10 is a third schematic diagram showing a structure of an apparatus for vehicle control according to an embodiment of the present disclosure.

Preferably, the manual operation information can include manual longitudinal operation information indicating an operation on a longitudinal controller of the vehicle. In particular, the determining unit 82 shown in FIG. 8 or FIG. 9 can include an obtaining sub-unit 821 and a first determining sub-unit 822, as shown in FIG. 10.

The obtaining sub-unit 821 can be configured to obtain automated longitudinal operation information indicating an operation on the longitudinal controller of the vehicle as calculated during automated driving of the vehicle.

In an embodiment of the present disclosure, an unmanned driving control unit provided on the vehicle can make decisions and control controllers on the vehicle, e.g., to control the vehicle to decelerate, accelerate, change its lane or stop, based on state information of the vehicle and environment information collected by sensors provided on the vehicle. The unmanned driving control unit can be implemented using a higher layer vehicle controller, e.g., an FPGA, a DSP, an ECU, a VCU, an industrial computer or any other device capable of information processing. The above obtaining sub-unit 821 can transmit a request to the unmanned driving control unit for obtaining the automated longitudinal operation information indicating the operation on the longitudinal controller of the vehicle. Alternatively, the obtaining sub-unit 821 can passively receive information transmitted periodically from the unmanned driving control unit and obtain the automated longitudinal operation information indicating the operation on the longitudinal controller of the vehicle from the information. The present disclosure is not limited to any specific approach for the obtaining sub-unit 821 to obtain the automated longitudinal operation information indicating the operation on the longitudinal controller of the vehicle.

The first determining sub-unit 822 is configured to determine the intervention intention of the driver based on a comparison between the manual longitudinal operation information and the automated longitudinal operation information.

Preferably, in an embodiment of the present disclosure, the manual longitudinal operation information can include a first value representing an extent of operation on the longitudinal controller by the driver and the automated longitudinal operation information can include a second value representing a calculated extent of operation on the longitudinal controller (calculated by the above unmanned driving control unit). In this case, the first determining sub-unit 822 can be configured to determine the intervention intention of the driver based on the first value and the second value.

The first determining sub-unit 822 can determine the intervention intention of the driver based on the first value and the second value, using any of the following Solutions 1~3.

Solution 1: The intervention intention of the driver can be determined to be the slow intervention when determining that the first value is larger than the second value and a difference between the first value and the second value is between a first threshold and a second threshold, the first threshold being smaller than the second threshold.

Solution 2: The intervention intention of the driver can be determined to be the emergency intervention when determining that the first value is larger than the second value and the difference between the first value and the second value is larger than the second threshold.

Solution 3: The intervention intention of the driver can be determined to be the slow intervention when determining that the first value is larger than the second value and the difference between the first value and the second value is between the first threshold and the second threshold, the first threshold being smaller than the second threshold, or to be the emergency intervention when determining that the first value is larger than the second value and the difference between the first value and the second value is larger than the second threshold.

Preferably, the above first determining sub-unit 822 can be further configured to: when determining that the first value is smaller than or equal to the second value, or that the first value is larger than the second value and the difference between the first value and the second value is smaller than the first threshold, determine that the intervention intention of the driver is an erroneous operation. In this case, the manual operation information of the driver is not responded to.

In the embodiment of the present disclosure, the first threshold and the second threshold can be set depending on actual requirements and the present disclosure is not limited thereto.

Preferably, when the first determining sub-unit 822 determines the intervention intention to be the emergency intervention based on the first value and the second value, the second control unit 84 can be configured to respond to the manual operation information and hand corresponding control of the vehicle over to the driver by controlling the longitudinal controller based on the first value and handing longitudinal control or full control of the vehicle over to the driver.

In the following, three examples will be given to describe the deceleration control, the acceleration control and the acceleration and deceleration control, respectively.

Example 1—Deceleration Control

The longitudinal controller is a brake controller. The above first value is a value representing an extent of braking in operating the brake controller by the driver, and the above second value is a value representing an extent of braking in operating the brake controller as calculated by the unmanned driving control unit. The extent of braking may refer to an opening degree of a brake pedal, a deceleration value or a torque value of an engine, and the present disclosure is not limited to any of these.

Example 2—Acceleration Control

In Example 2, the longitudinal controller is a throttle controller. The above first value a value representing an extent of acceleration in operating the throttle controller by the driver, and the above second value a value representing an extent of acceleration in operating the throttle controller as calculated by the unmanned driving control unit. The extent of braking may refer to an opening degree of a throttle pedal, an acceleration value, a torque value of an engine or a throttle percentage, and the present disclosure is not limited to any of these.

Example 3—Acceleration and Deceleration Control

Preferably, in order to avoid incorrect vehicle control caused by controlling the brake controller and the throttle controller simultaneously due to erroneous operations by the user, in an embodiment of the present disclosure, priorities can be set in advance, such that the priority of the deceleration control is higher than that of the acceleration control. When the manual longitudinal operation information includes first information indicating a deceleration control of the vehicle (i.e., operation information indicating the operation on the brake controller), the intervention intention of the driver is determined based on the first information. When the manual longitudinal operation information includes second information indicating an acceleration control of the vehicle (i.e., operation information indicating the operation on the throttle controller), it is also required to determine whether the manual longitudinal operation information also includes the above first information, and if so, the intervention intention of the driver is determined based on the first information, or otherwise the intervention intention of the driver is determined based on the second information.

Figure 11:
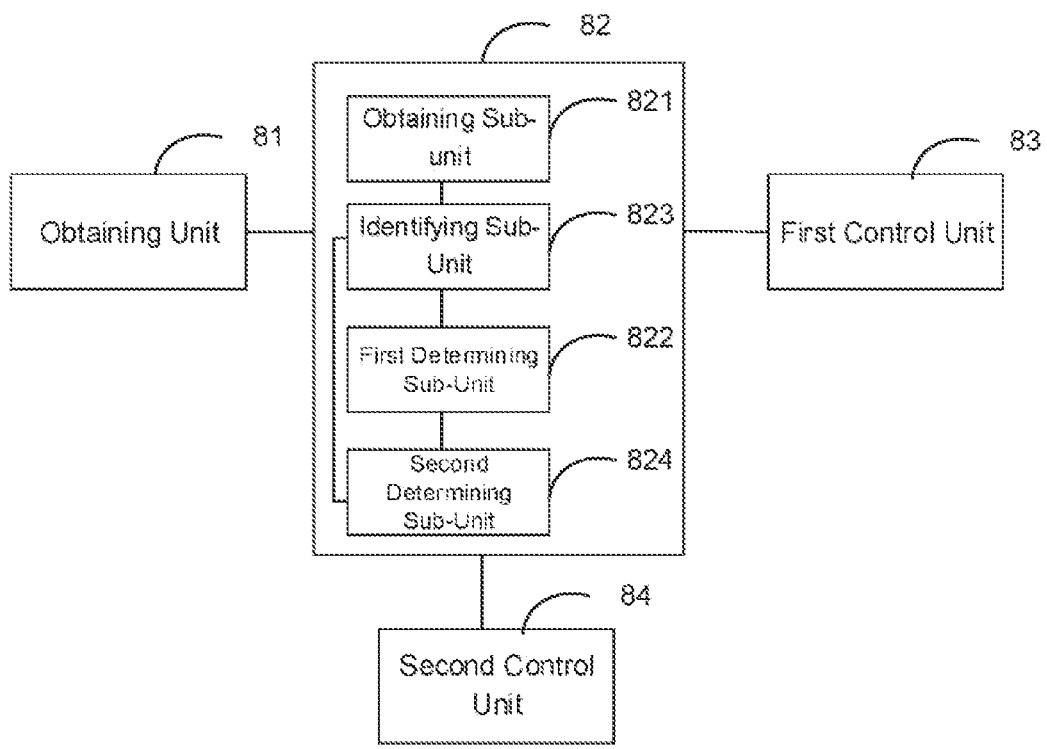
FIG. 11 is a fourth schematic diagram showing a structure of an apparatus for vehicle control according to an embodiment of the present disclosure.

Preferably, the determining unit 82 shown in FIG. 10 can further include an identifying sub-unit 823 and a second determining sub-unit 824, as shown in FIG. 11.

The identifying sub-unit 823 can be configured to identify whether the manual longitudinal operation information includes a third value representing an extent of braking in operating a brake controller, and if so, trigger the second determining sub-unit 824, or otherwise trigger the first determining sub-unit 822.

The second determining sub-unit 824 can be configured to determine the intervention intention of the driver based on the third value and a fourth value included in the automated longitudinal operation information and representing an extent of braking in operating the brake controller, which includes: determining the intervention intention of the driver to be the slow intervention when the third value is larger than the fourth value and a difference between the third value and the fourth value is between a third threshold and a fourth threshold, the third threshold being smaller than the fourth threshold; determining the intervention intention of the driver to be the emergency intervention when the third value is larger than the fourth value and the difference between the third value and the fourth value is larger than the fourth threshold; or triggering the first determining sub-unit 822 when the third value is smaller than the fourth value.

Embodiment 6—Lateral Control of Vehicle

Preferably, the manual operation information may include manual lateral operation information indicating an operation on a lateral controller.

The determining unit 82 can be configured to determine whether a fifth value included in the manual longitudinal operation information and representing an extent of operation on the lateral controller is larger than a predetermined fifth threshold, and if so, determine the intervention intention of the driver to be the emergency intervention.

The second control unit 84 can be configured to control the lateral controller based on the fifth value and hand lateral control or full control of the vehicle over to the driver.

The manual lateral operation information may include an actual torque value actually applied by the steering wheel to a hydraulic steering mechanism or a hydraulic-electric hybrid steering mechanism or any other steering actuator of the vehicle.

Embodiment 7

Figure 12:
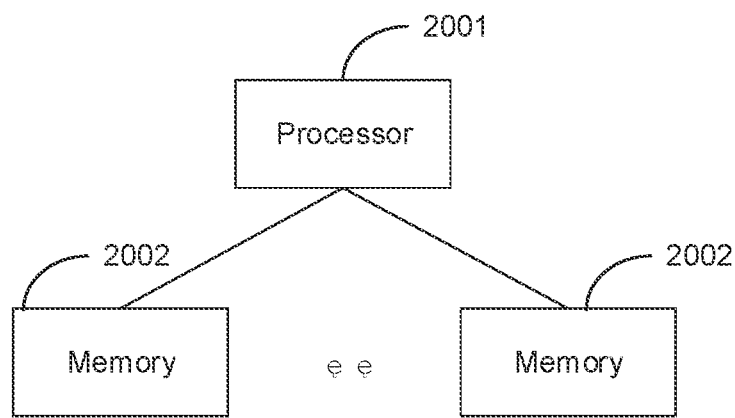
FIG. 12 is a fifth schematic diagram showing a structure of an apparatus for vehicle control according to an embodiment of the present disclosure.

Based on the same concept, an apparatus for vehicle control is provided according to the present disclosure. As shown in FIG. 12, in an exemplary embodiment, the apparatus includes a processor 2001 and at least one memory 2002 storing at least one machine executable instruction. The processor 2001 is operative to execute the at least one machine executable instruction to: obtain manual operation information of a vehicle; determine an intervention intention of a driver based on the manual operation information; and control, when the vehicle is currently in an automated driving mode and the intervention intention is determined to be a slow intervention, the vehicle to reach a predetermined safe state and hand corresponding control of the vehicle over to the driver.

The processor 2001 can be further operative to execute the at least one machine executable instruction to: respond, when the vehicle is currently in the automated driving mode and the intervention intention is determined to be an emergency intervention, to the manual operation information and hand corresponding control of the vehicle over to the driver.

The processor 2001 being operative to execute the at least one machine executable instruction to control the vehicle to reach the predetermined safe state may include the processor 2001 being operative to execute the at least one machine executable instruction to: control the vehicle to decelerate and maintain its lane, until the vehicle stops in a safe area.

The manual operation information may include manual longitudinal operation information indicating an operation on a longitudinal controller of the vehicle. The processor 2001 being operative to execute the at least one machine executable instruction to determine the intervention intention of the driver based on the manual operation information may include the processor 2001 being operative to execute the at least one machine executable instruction to: obtain automated longitudinal operation information indicating an operation on the longitudinal controller of the vehicle as calculated during automated driving of the vehicle; and determine the intervention intention of the driver based on a comparison between the manual longitudinal operation information and the automated longitudinal operation information.

The manual longitudinal operation information may include a first value representing an extent of operation on the longitudinal controller by the driver and the automated longitudinal operation information may include a second value representing a calculated extent of operation on the longitudinal controller. The processor 2001 being operative to execute the at least one machine executable instruction to determine the intervention intention of the driver based on the comparison between the manual longitudinal operation information and the automated longitudinal operation information may include the processor 2001 being operative to execute the at least one machine executable instruction to: determine the intervention intention of the driver based on the first value and the second value. The processor 2001 being operative to execute the at least one machine executable instruction to determine the intervention intention of the driver based on the first value and the second value may include the processor 2001 being operative to execute the at least one machine executable instruction to: determine the intervention intention of the driver to be the slow intervention when determining that the first value is larger than the second value and a difference between the first value and the second value is between a first threshold and a second threshold, the first threshold being smaller than the second threshold; and/or determine the intervention intention of the driver to be the emergency intervention when determining that the first value is larger than the second value and the difference between the first value and the second value is larger than the second threshold.

The longitudinal controller can be a brake controller, and each of the first value and the second value can be a value representing an extent of braking in operating the brake controller.

The longitudinal controller can be a throttle controller, and each of the first value and the second value can be a value representing an extent of acceleration in operating the throttle controller.

The processor 2001 can be further operative to execute the at least one machine executable instruction to, prior to the processor 2001 being operative to execute the at least one machine executable instruction to determine the intervention intention of the driver based on the first value and the second value: identify whether the manual longitudinal operation information includes a third value representing an extent of braking in operating a brake controller, and if so: determine the intervention intention of the driver based on the third value and a fourth value included in the automated longitudinal operation information and representing an extent of braking in operating the brake controller, comprising: determining the intervention intention of the driver to be the slow intervention when the third value is larger than the fourth value and a difference between the third value and the fourth value is between a third threshold and a fourth threshold, the third threshold being smaller than the fourth threshold; determining the intervention intention of the driver to be the emergency intervention when the third value is larger than the fourth value and the difference between the third value and the fourth value is larger than the fourth threshold; or performing the step of determining the intervention intention of the driver based on the first value and the second value when the third value is smaller than the fourth value; or otherwise: perform the step of determining the intervention intention of the driver based on the first value and the second value when the third value is smaller than the fourth value.

The processor 2001 being operative to execute the at least one machine executable instruction to respond, when the vehicle is currently in the automated driving mode and the intervention intention is determined to be the emergency intervention, to the manual operation information and hand the corresponding control of the vehicle over to the driver may include the processor 2001 being operative to execute the at least one machine executable instruction to: control the longitudinal controller based on the first value and hand longitudinal control or full control of the vehicle over to the driver.

The manual operation information may include manual lateral operation information indicating an operation on a lateral controller. The processor 2001 being operative to execute the at least one machine executable instruction to determine the intervention intention of the driver based on the manual operation information may include the processor 2001 being operative to execute the at least one machine executable instruction to: determine whether a fifth value included in the manual longitudinal operation information and representing an extent of operation on the lateral controller is larger than a predetermined fifth threshold, and if so, determine the intervention intention of the driver to be the emergency intervention. The processor 2001 being operative to execute the at least one machine executable instruction to respond to the manual operation information and hand the corresponding control of the vehicle over to the driver may include the processor 2001 being operative to execute the at least one machine executable instruction to: control the lateral controller based on the fifth value and hand lateral control or full control of the vehicle over to the driver.

The processor 2001 being operative to execute the at least one machine executable instruction to obtain the manual operation information of the vehicle may include the processor 2001 being operative to execute the at least one machine executable instruction to: collect a control instruction issued by the driver to operate a lateral controller and/or a longitudinal controller of the vehicle, and obtain the manual operation information from the control instruction; and/or collect a voice instruction from and driver, and obtain the manual operation information by identifying the voice instruction; and/or collect touch information indicating a particular gesture made by the driver in a particular area on a touch display device, and obtain the manual operation information by identifying the touch information; and/or receive a control instruction inputted by the driver via a preconfigured physical switch, and obtain the manual operation information by parsing the control instruction; and/or obtain the manual operation information by identifying an operation on a rocker or a handle; and/or receive a control instruction issued by the driver by executing a preconfigured application on a smart terminal, and obtain the manual operation information by parsing the control instruction; and/or collect brainwave information of the driver using a brainwave collector, and obtain the manual operation information by identifying the brainwave information; and/or capture a body movement and/or a facial expression of the driver using a monitoring sensor, and obtain the manual operation information from the body movement and/or the facial expression.

Based on the same concept as the above method, a storage medium (which can be a non-volatile machine readable storage medium) is provided according to an embodiment of the present disclosure. The storage medium stores a computer program for vehicle control. The computer program includes codes configured to: obtain manual operation information of a vehicle; determine an intervention intention of a driver based on the manual operation information; and control, when the vehicle is currently in an automated driving mode and the intervention intention is determined to be a slow intervention, the vehicle to reach a predetermined safe state and hand corresponding control of the vehicle over to the driver.

Based on the same concept as the above method, a computer program is provided according to an embodiment of the present disclosure. The computer program includes codes for vehicle control, the codes being configured to: obtain manual operation information of a vehicle; determine an intervention intention of a driver based on the manual operation information; and control, when the vehicle is currently in an automated driving mode and the intervention intention is determined to be a slow intervention, the vehicle to reach a predetermined safe state and hand corresponding control of the vehicle over to the driver.

To summarize, with the solutions according to the present disclosure, in an automated driving mode and before switched to a manual driving mode, a vehicle can be control to reach a safe state in response to determining that a driver is to intervene slowly based on manual operation information, and corresponding control of the vehicle can be handed over to the driver while the vehicle is in the safe state. On one hand, the control of the vehicle can be transferred while ensuring safety of the vehicle. On the other hand, the corresponding control of the vehicle to be handed over to the driver can be partial or full control of the vehicle, which is more flexible and allows responding and adapting time for the driver. In this way, the chance that the driver would operate erroneously can be further reduced and the safety in driving the vehicle can be further improved.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof.

Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for vehicle control, comprising:
   obtaining manual operation information of a vehicle, the manual operation information comprising a first value representing an extent of operation applied by a driver of the vehicle in operating a longitudinal controller;
   obtaining automated operation information for the vehicle, the automated operation information comprising a second value representing an extent of operation calculated by a driving control unit to be applied to the longitudinal controller;
   determining an intervention intention of the driver based on the manual operation information and the automated operation information, comprising:
   determining the intervention intention to be an erroneous operation in response to the first value being larger than the second value and a difference between the first value and the second value being less than a first threshold; and
   determining the intervention intention to be a slow intervention in response to the first value being larger than the second value and the difference between the first value and the second value being between the first threshold and a second threshold, wherein the first threshold is less than the second threshold; and
   controlling, in response to the vehicle being currently in an automated driving mode and the intervention intention being determined to be the erroneous operation, the vehicle to be kept in the automated driving mode.

2. The method of claim 1, wherein determining the intervention intention of the driver further comprises:
   determining the intervention intention to be an emergency intervention in response to the first value being larger than the second value and the difference between the first value and the second value being greater than the second threshold.

3. The method of claim 2, further comprising:
   responding, in response to the vehicle being currently in the automated driving mode and the intervention intention being determined to be the emergency intervention, to the manual operation information and handing corresponding control of the vehicle over to the driver.

4. The method of claim 1, further comprising:
   controlling, in response to the vehicle being currently in the automated driving mode and the intervention intention being determined to be the slow intervention, the vehicle to reach a predetermined safe state and handing control of the vehicle over to the driver.

5. The method of claim 4, wherein controlling the vehicle to reach the predetermined safe state comprises:
   controlling the vehicle to decelerate and maintain its lane, until the vehicle stops in a safe area.

6. The method of claim 1, wherein the manual operation information further comprises a third value representing an extent of operation on a lateral controller of the vehicle, and wherein the method further comprises:
   determining the intervention intention to be an emergency intervention in response to the third value being greater than a predetermined threshold.

7. The method of claim 6, further comprising, in response to the vehicle being currently in the automated driving mode and the intervention intention being determined to be the emergency intervention:
   controlling the lateral controller based on the third value and handing lateral control of the vehicle over to the driver.

8. The method of claim 6, wherein the third value comprises a torque value applied by a steering wheel in the vehicle to a hydraulic steering mechanism or a hydraulic-electric hybrid steering mechanism.

9. A vehicle, comprising:
   a driving control unit configured to control one or more functions of the vehicle;
   a longitudinal controller configured to apply a longitudinal operation to the vehicle;
   a processor; and
   at least one memory storing executable instructions, execution of which by the processor causes the processor to:
   obtain manual operation information of the vehicle, the manual operation information comprising a first value representing an extent of operation applied by a driver of the vehicle in operating the longitudinal controller;
obtain automated operation information for the vehicle, the automated operation information comprising a second value representing an extent of operation calculated by the driving control unit to be applied to the longitudinal controller;
determine an intervention intention of the driver based on the manual operation information and the automated operation information,
wherein the intervention intention is determined to be an erroneous operation in response to the first value being larger than the second value and a difference between the first value and the second value being less than a first threshold, and
wherein the intervention intention is determined to be a slow intervention in response to the first value being larger than the second value and the difference between the first value and the second value being between the first threshold and a second threshold, wherein the first threshold is less than the second threshold; and
control, in response to the vehicle being currently in an automated driving mode and the intervention intention being determined to be the erroneous operation, the vehicle to be kept in the automated driving mode.

10. The vehicle of claim 9, wherein the first value represents the extent of braking applied by the driver of the vehicle as one of:
an opening degree of a brake pedal;
a deceleration value of the vehicle; or
a torque value of an engine in the vehicle.

11. The vehicle of claim 9, wherein
the instructions further cause the processor to control, in response to the vehicle being currently in the automated driving mode and the intervention intention being determined to be the slow intervention, the vehicle to reach a predetermined safe state and handing partial control of the vehicle over to the driver.

12. The vehicle of claim 9, wherein
the instructions further cause the processor to control, in response to the vehicle being currently in the automated driving mode and the intervention intention being determined to be the slow intervention, the vehicle to reach a predetermined safe state and handing full control of the vehicle over to the driver.

13. The vehicle of claim 9, further comprising:
a lateral controller;
wherein the manual operation information further comprises a third value representing an extent of operation on a lateral controller of the vehicle, and wherein the instructions further cause the processor to:
determine the intervention intention to be an emergency intervention in response to the third value being greater than a predetermined threshold.

14. The vehicle of claim 13, wherein the lateral controller comprises a steering wheel, and wherein the third value comprises a torque value applied by the steering wheel to a hydraulic steering mechanism or a hydraulic-electric hybrid steering mechanism.

15. A non-transitory computer-readable storage medium storing executable instructions, execution of which by one or more processors causing the one or more processors to:
obtain manual operation information of a vehicle, the manual operation information comprising a first value representing an extent of operation applied by a driver of the vehicle in operating a longitudinal controller;
obtain automated operation information for the vehicle, the automated operation information comprising a second value representing an extent of operation calculated by a driving control unit to be applied to the longitudinal controller;
determine an intervention intention of the driver based on the manual operation information and the automated operation information,
wherein the intervention intention is determined to be an erroneous operation in response to the first value being larger than the second value and a difference between the first value and the second value being less than a first threshold, and
wherein the intervention intention is determined to be a slow intervention in response to the first value being larger than the second value and the difference between the first value and the second value being between the first threshold and a second threshold, wherein the first threshold is less than the second threshold; and
control, in response to the vehicle being currently in an automated driving mode and the intervention intention being determined to be the erroneous operation, the vehicle to be kept in the automated driving mode.

16. The non-transitory computer-readable storage medium of claim 15:
wherein the first value represents an extent of acceleration applied by the driver of the vehicle in operating a throttle controller; and
wherein the second value represents an extent of acceleration calculated by the driving control unit to be applied to the throttle controller.

17. The non-transitory computer-readable storage medium of claim 15, wherein the first value represents an extent of braking applied by the driver of the vehicle in operating a brake controller, wherein the second value represents an extent of braking calculated by the driving control unit to be applied to the brake controller, wherein the manual operation information further comprises a fourth value representing an extent of acceleration applied by the driver of the vehicle in operating a throttle controller, wherein the automated operation information further comprises a fifth value representing an extent of acceleration calculated by the driving control unit to be applied to the throttle controller, and wherein execution of the instructions further causes the one or more processors to:
in response to the first value being smaller than the second value, determine the intervention intention of the driver based on the fourth value and the fifth value.

18. The non-transitory computer-readable storage medium of claim 17, wherein execution of the instructions further causes the one or more processors to:
determine the intervention intention of the driver to be a slow intervention based on the fourth value being larger than the fifth value.

* * * * *